United States Patent
Hanks

(10) Patent No.: US 7,468,815 B2
(45) Date of Patent: Dec. 23, 2008

(54) OPTICAL DATA PROCESSING USING PHOTO-DETECTOR ARRAY AND FRAMING MARKS ON OPTICAL MEDIA

(75) Inventor: Darwin Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 10/955,703

(22) Filed: Sep. 30, 2004

(65) Prior Publication Data

US 2006/0072401 A1  Apr. 6, 2006

(51) Int. Cl.
  *H04N 1/387* (2006.01)
(52) U.S. Cl. .................. 358/3.28; 358/1.2
(58) Field of Classification Search .............. None
  See application file for complete search history.

(56) References Cited

U.S. PATENT DOCUMENTS

| | | | |
|---|---|---|---|
| 5,343,455 A | 8/1994 | Takeuchi et al. | |
| 5,600,626 A | 2/1997 | Yokogawa et al. | |
| 5,627,805 A | 5/1997 | Finkelstein et al. | |
| 5,907,526 A | 5/1999 | Alon et al. | |
| 5,914,783 A | 6/1999 | Barrus | |
| 6,046,969 A | 4/2000 | Towner et al. | |
| 6,111,831 A | 8/2000 | Alon et al. | |
| 6,314,062 B1 | 11/2001 | Suzuki et al. | |
| 6,380,527 B1 | 4/2002 | Davis | |
| 6,483,092 B2 | 11/2002 | Davis | |
| 6,501,721 B2 | 12/2002 | Hogan | |
| 6,631,302 B1 | 10/2003 | Wilson | |
| 6,995,882 B2 * | 2/2006 | Horimai | 359/2 |
| 7,187,476 B2 * | 3/2007 | Umeda et al. | 358/3.28 |
| 7,298,510 B2 * | 11/2007 | Natori | 358/1.15 |
| 2003/0142360 A1 * | 7/2003 | Johnson et al. | 358/3.28 |

OTHER PUBLICATIONS

"Concept for Utilizing Full Areas of STJ Photodetector Arrays", printed from http://www.nasatech.com/Briefs/Apr02/NPO20768.html, 3 pages.
"Corrugated Quantum-Well Infrared Photodetector Arrays", printed from http://www.nasatech.com/Briefs/Jul99/PTB07992.html, 2 pages.
"Wollaston Prism", printed from http://hyperphysics.phy-astr.gsu.edu/hbase/phyopt/cdopt.html#c3, 2 pages, Sep. 30, 2004.
"Polarizing Beam Splitter Cubes", Oriel Instruments Catalog, 1 page, Sep. 30, 2004.
"Who says you can't be cutting-edge and tried and true?", DLP Projectors overview, http://www.dlp.com/dlp_technology/dlp_technology_overview.asp, printed on Feb. 28, 2004, 3 pages.

* cited by examiner

*Primary Examiner*—Joseph Feild
*Assistant Examiner*—Joseph Haley

(57) ABSTRACT

An optical system configured for optical data processing is disclosed. In one example of the system, a photodetector array is configured to obtain an image of light modulated by reflection off a data track defined on optical media. In this example, the image contains at least one framing mark and at least one data region. A post-processor is configured to analyze the image and to recognize the framing mark and data within the data region.

16 Claims, 3 Drawing Sheets

OPTICAL DATA PROCESSING USING PHOTO-DETECTOR ARRAY AND FRAMING MARKS ON OPTICAL MEDIA

BACKGROUND

CDs (compact discs) and DVDs (digital video (or versatile) discs) are optical disk storage media which are used to store large amounts of digital data. A typical CD includes a long spiraling track which originates near the center of the disk, and which spirals toward the edge of the disk. Information is stored by millions of bumps and flat areas ("lands"). Such a track provides for the storage of large amounts of data.

While the above system is effective, improvements in optical data processing are desirable.

SUMMARY

An optical system configured for optical data processing is disclosed. In one example of the system, a photodetector array is configured to obtain an image of light modulated by reflection off a data track defined on optical media. In this example, the image contains at least one framing mark and at least one data region. A post-processor is configured to analyze the image and to recognize the framing mark and data within the data region.

BRIEF DESCRIPTION OF THE DRAWINGS

The following detailed description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

Figure 1:
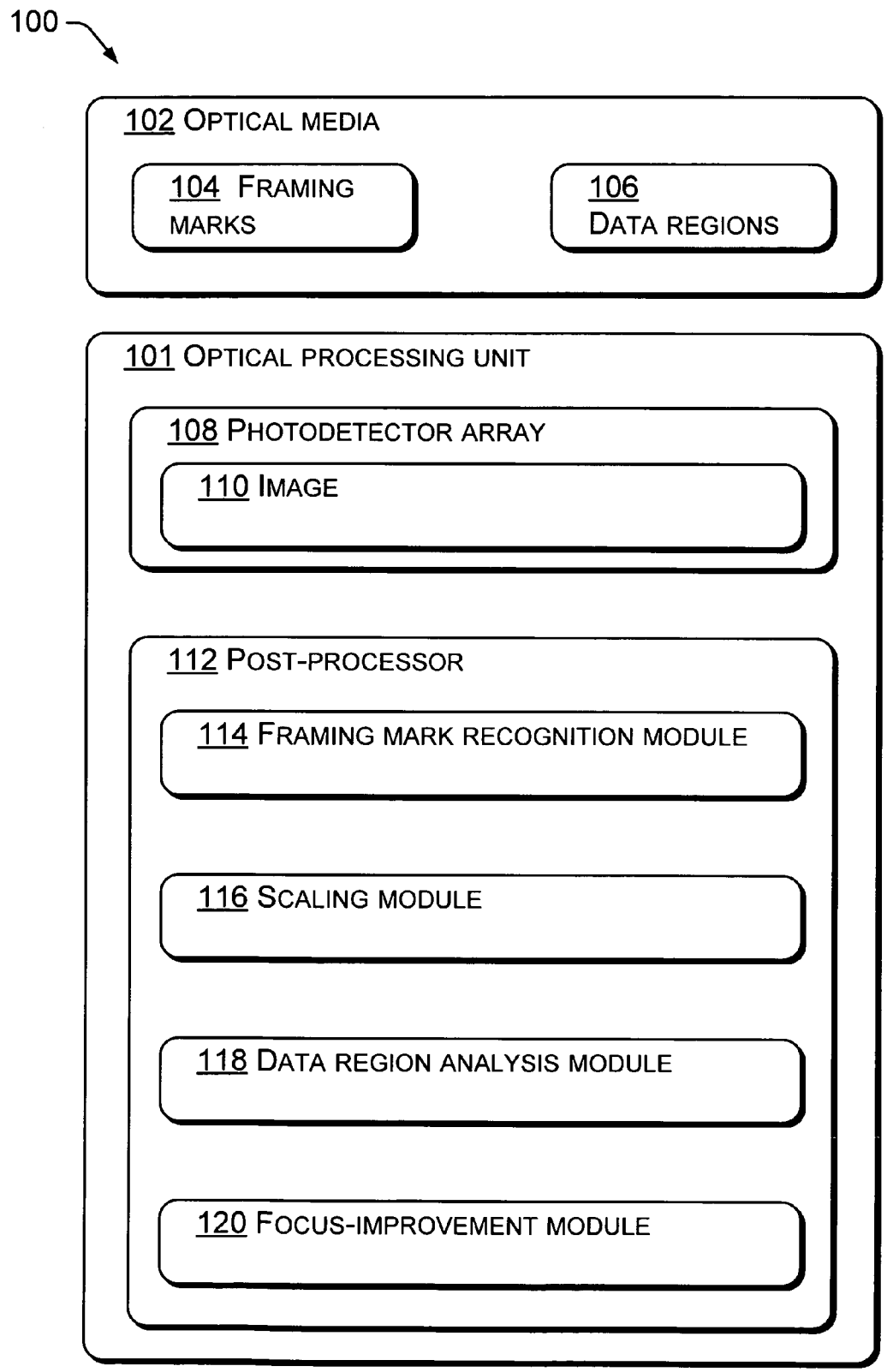
FIG. 1 is a block diagram illustrating an example of an optical data processing system.

FIG. 1 is a block diagram illustrating an exemplary optical data system 100, including an optical processing system 101 and optical media 102, configured for optical data processing. The optical media 102 may be configured as a disk having one or more layers, such as a CD (compact disc) or DVD (digital versatile (or video) disc). An elongated spiraling data track (discussed infra with respect to FIGS. 2 and 3) includes a plurality of framing marks 104 and data regions 106. The framing marks 104 are configured to include data, indicia, markings and/or other characters that distinguish the framing marks from the data regions 106. The framing marks 104 may "frame" or surround all or part of the data regions 106. In a typical embodiment, one or more framing marks 104 located on a data track defined on the optical media 102 serves to indicate the location of one or more data regions.

In one example, the optical processing system 101 includes a photodetector array 108 and a post-processor 112. The photodetector array 108 is configured with appropriate lenses to obtain an image of light modulated by reflection off a data track defined on optical media 102. For example, light modulation may result due to differences in the reflective characteristics of data elements representing ones and zeros. In one embodiment, the photodetector array 108 creates a series of images 110 of portions of the optical media 102, wherein each image 110 includes at least one framing mark 104 and at least one data region 106.

A post-processor 112, configured in software, firmware, hardware or a combination thereof, receives and processes images 110 from the photodetector array 108. In one example, the post-processor 112 analyzes the images, thereby recognizing framing marks 104 and data within the data regions 106. The post-processor 112 may define software code or hardware logic in a number of configurations. In the example of FIG. 1, the post-processor 112 is configured to include a framing mark recognition module 114, a scaling module 116, a data region analysis module 118 and a focus-improvement module 120. While modules 114-120 are representative of functional areas performed by the post-processor 112, the post-processor could be organized differently, while still providing similar functionality. Accordingly, the modules 114-120 are an example of code or logic that may be configured to perform the functionality described.

A framing mark recognition module 114 is configured to recognize one or more framing marks within the image 110. One implementation of the framing mark recognition module 114 recognizes framing marks within the image 110 by recognizing data which is not allowed for use within data regions and/or which is reserved for use within framing marks. The size or scale of such data within the image 110 may be uncertain; accordingly, the framing mark recognition module 114 is configured to recognize data representing framing marks of varying sizes. For example, the number of pixels used to form the framing mark within the image 110 may be variable, in that the scale of the image 110 is variable. Thus, the framing mark recognition module 114 should analyze the image 110 to look for framing marks without limitation as to the size of the framing mark within the image 110. Once a tentative recognition of a framing mark is made, a comparison is made with known framing marks to confirm discovery of the framing mark and to determine boundaries of the recognized framing mark within the image.

A scaling module 116 is configured to determine a scale associated with the image 110. The scale is determined by comparing the size of a feature on the image 110 with its known actual size on the optical disk. In an example, the scale is determined by comparison of the recognized framing mark within the image 110 with a known size of the recognized framing mark as defined on the optical media 102. The comparison yields a ratio, from which the scale of the image 110 can be determined.

A data region analysis module 118 is configured to locate and obtain data from a data region 106 within the image 110. The data region 106 is located using the recognized framing mark 104 along with the scale determined by the scaling module 116. In particular, each data region is a known or prescribed distance and direction or orientation from an associated or adjacent framing mark. Upon location of the data region 106 within the image 110, the data region analysis module 118 is configured to read data elements from within the data region 106. For example, the data analysis module 118 may use the scale (which may have been determined by the scaling module 116 or similar) to configure recognition functionality adapted to read data elements within the data region 106. The data region may be configured as an array of data elements, wherein each of the data elements forming the array may be either a "bump or land" defined on the optical disk. Alternatively, the data elements may be formed according to another technology, now known or later developed.

A focus-improvement module 120 is configured to digitally focus the portions of the image 110 depicting the data regions 106 by analyzing distortion in the framing marks 104 within the image and by reversing that distortion on the data region(s) 106 within the image. For example, distortion to the framing marks 104 caused by locating the photodetector array 108 or associated lenses too close or too distant from the optical media 102 may be removed by using the appearance of the framing marks in the image, together with their actual appearance, as input to an algorithm. The algorithm then reverses the distortion caused by misplacement of the photodetector array 108 and/or lenses based on the difference between the image-appearance and actual-appearance of the framing mark(s).

Figure 2:
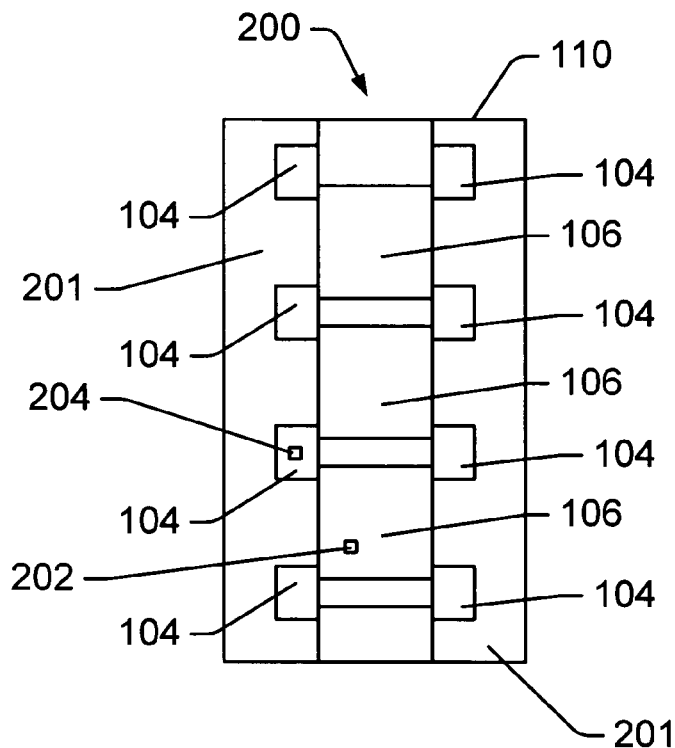
FIG. 2 is a diagram illustrating a short segment of a first exemplary data track.

FIG. 2 is a diagram illustrating a short segment of a first exemplary data track 200 defined on the optical media 102 (FIG. 1). Adjacent turns of the data track 200 are separated by a narrow region 201; where the data track 200 is a spiral, the narrow region 201 is also a spiral that separates adjacent turns of the data track. The view of FIG. 2 is exemplary of the image 110 obtained by the photodetector array 108 (FIG. 1). The data track may be configured as a spiral on a disk similar to CD or DVD disks; alternatively, the data track may be defined on optical media of any configuration. In the example of FIG. 2, framing marks 104 and data regions 106 are configured in an alternating pattern. In the example of FIG. 2, where an image 110 includes four framing marks 104, a data region 106 may be assumed to be located between the four framing marks. Note that the location of the data region could be successfully described by two, or possibly four, framing marks. Similarly, since framing marks are adjacent to two data regions, each framing mark indicates locations of two data regions. The data regions 106 include a plurality of data elements 202 (e.g. bumps and lands seen in conventional CDs and DVDs), indicia or other characters which define data contained within the data region. The data elements may be organized as an array having dimensions M by N, where M may equal N, and where M and N are greater than, or equal to, one. Each framing mark 104 includes data markings 204, indicia or other characters which are unique to framing marks 104 and which would not be found in the data regions 106. Accordingly, the framing marks 104 and data regions 106 are easily distinguished.

Figure 3:
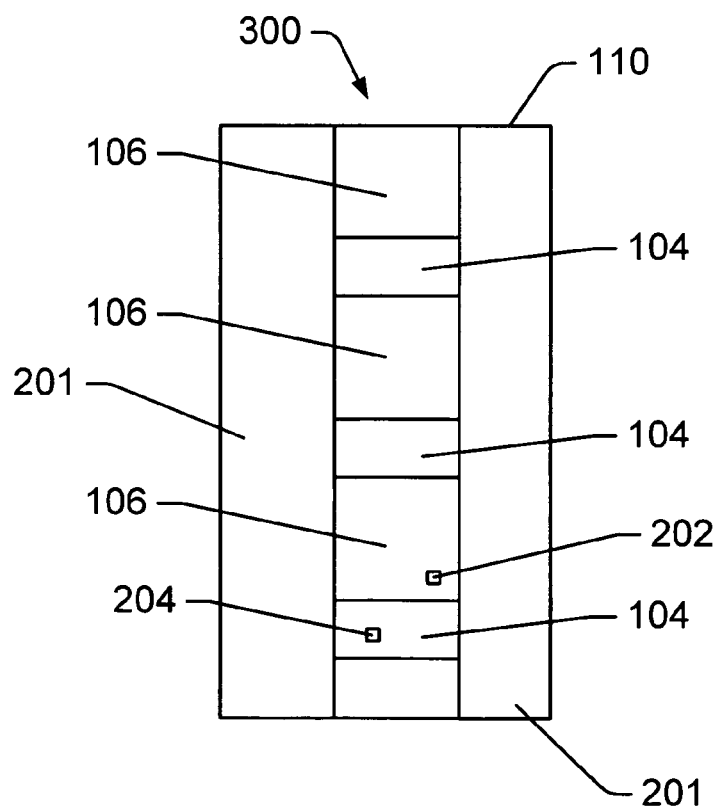
FIG. 3 is a diagram illustrating a short segment of a second exemplary data track.

FIG. 3 is a diagram illustrating a short segment of a second exemplary data track 300 defined on the optical media 102 (FIG. 1). Adjacent turns of the data track 200 are separated by a narrow region 201; where the data track 200 is a spiral, the narrow region 201 is also a spiral that separates adjacent turns of the data track. The view of FIG. 3 is exemplary of the image 110 obtained by the photodetector array 108 (FIG. 1). In the example of FIG. 2, framing marks 104 and data regions 106 are configured in an alternating pattern. In the example of FIG. 3, where an image 110 includes two framing marks 104, a data region 106 may be assumed to be located between the two framing marks. The data regions 106 include data elements 202 (e.g. bumps and lands seen in conventional CDs and DVDs), indicia or other characters which define data contained within the data region. The data elements may be organized as an array having dimensions M by N, where M may equal N, and where M and N are greater than, or equal to, one. Each framing mark includes markings 204, indicia or other characters which are unique to framing marks and which would not be found in the data regions. Accordingly, the framing marks 104 and data regions 106 are easily distinguished.

Figure 4:
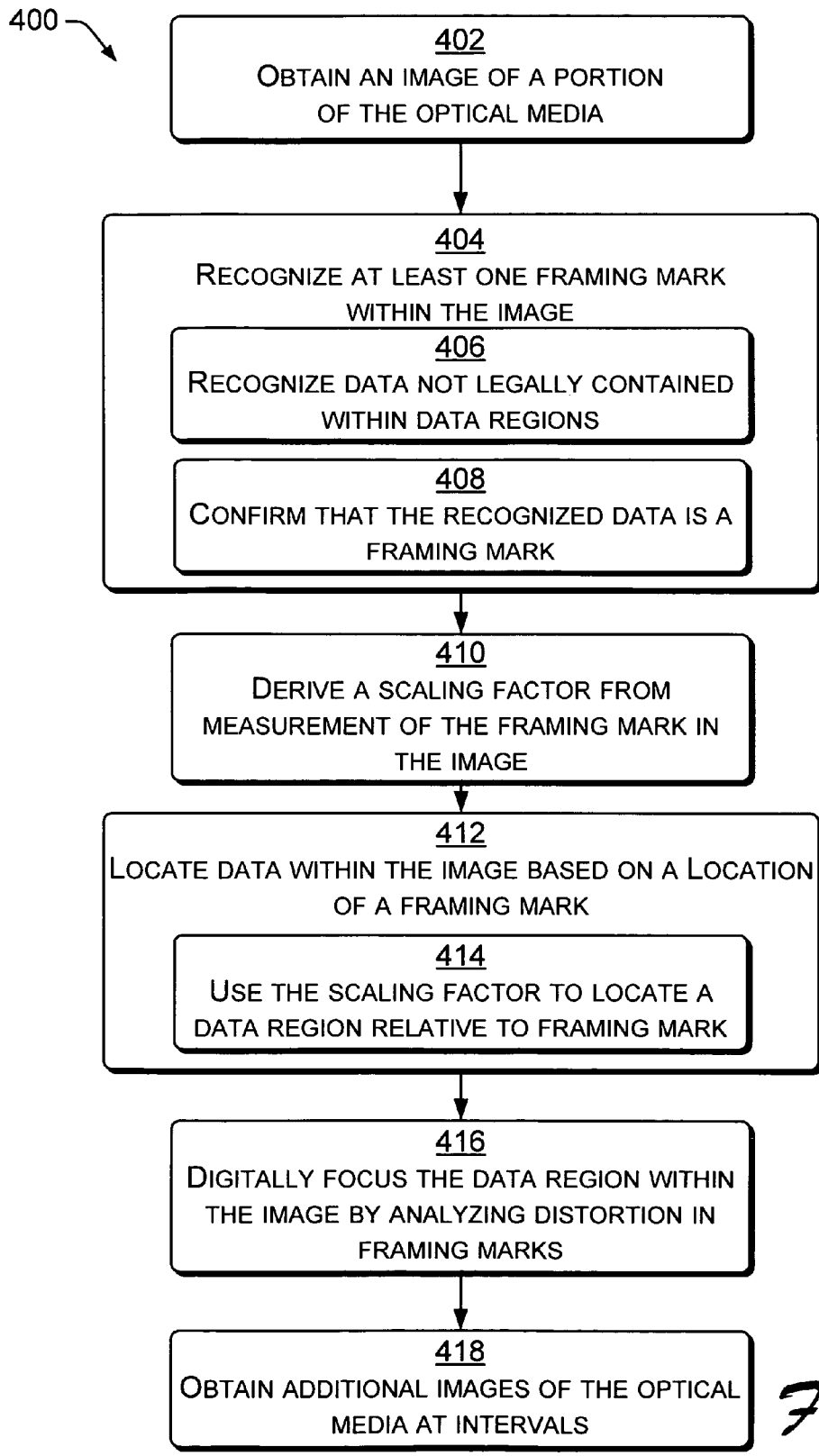
FIG. 4 is a flow diagram that describes an example of how an optical data processing system may be operated.

FIG. 4 is a flow diagram 400 that describes one example by which optical data processing may be performed, in this case using the optical processing unit 101 and optical media 102 of FIG. 1. The elements of the method may be performed by any desired means, such as by the execution of processor-readable instructions defined on a processor-readable media, such as a disk, a ROM (read only memory) or other memory device. The elements of the method may also be performed by operation of hardware devices, such as application specific integrated circuits (ASICs). Also, actions described in any block may be performed in parallel with actions described in other blocks, may occur in an alternate order, or may be distributed in a manner which associates actions with more than one other block. As used herein, the phrase computer- or processor-readable media or medium can refer to any medium that can contain, store or propagate computer executable instructions. Thus, in this document, the phrase computer- or processor-readable medium may refer to a medium such as an optical storage device (e.g., a CD ROM), a solid state memory device such as RAM (random access memory) or ROM, a magnetic storage device (e.g., a magnetic tape), or memory or media or other technology now known or later developed. The phrase computer- or processor-readable medium or media may also refer to signals that are used to propagate the computer-executable instructions over a network or a network system, such as an intranet, the World Wide Web, the Internet or similar network.

At block 402, an image 110 (FIGS. 1-3) of a portion of the optical media 102 (FIG. 1) is obtained. In one example, the image 110 is obtained by a photodetector array 108 (FIG. 1) or similar device.

At block 404, at least one framing mark 104 is recognized within the image 110. Referring momentarily to FIGS. 2 and 3, it can be seen that one or more framing marks 104 may be distributed within the image 110. In one implementation of the method 400, at least one framing mark is recognized according to blocks 406-408. At block 406, data not legally contained within data regions 106 is recognized, indicating that the data is within a framing mark 104. At block 408, the recognized data is compared to an appearance of a known framing mark, thereby confirming that the recognized data is a framing mark.

At block 410, a scaling factor is derived from measurement of the framing mark 104 in the image 110, and from comparison of the measurement to known dimensions of the framing mark. For example, a recognized framing mark will have a known size on the optical media 102. The size of the recognized framing mark 104 on the image 110 can be measured. The known size and the measured size can be used to create a scaling factor. The created scaling factor is used to translate the size of any object in the image 110 to an actual size of the object on the optical media.

At block 412, data within the image 110 is located based on location of a framing mark 104. In a typical implementation, the data is contained within a data region 106, which is positioned in a known location with respect to one or more framing marks 104. At block 414, in some embodiments, the scaling factor is used to locate a data region 106 relative to a location of a known framing mark 104. For example, where the relative size and location of framing marks 104 and data regions 106 are known and/or predetermined, and where the location of at least one framing mark 104 is known, the location of one or more data regions 106 can be determined by applying the scaling factor to the image 110.

At block 416, in one optional implementation, the data region 106 within the image is digitally focused by analyzing distortion in framing marks 104. For example, where the appearance of the framing mark 104 is different within the image 110 than an expected appearance, the difference may be analyzed. In particular, the cause of the distortion may be discovered to be related to a slightly out-of-focus condition. An algorithm may be applied to correct the appearance of the framing mark 104. Typically, the algorithm is a function of the distance between the photodetector array 108 and the optical media 102, which can be a function of the scaling factor. Thus, the scaling factor may be used to select a mapping algorithm from a look-up table which may be used to remove distortion. Once selected, the algorithm may additionally be applied to the data region 106 to sharpen the focus of the data contained within the data region.

At block 418, after the data from the data region 106 has been read, additional images 110 of the optical media 102 may be obtained. In some applications, a large number of images are sequentially read from the optical media—typically as an optical disk is spun. In such an application, the photodetector array 108 would be used to image framing marks 104 and data regions 106 located along an elongated data track configured as a spiral on the optical disk. However, in other applications, the optical media could be differently configured.

Although the above disclosure has been described in language specific to structural features and/or methodological steps, it is to be understood that the appended claims are not limited to the specific features or steps described. Rather, the specific features and steps are exemplary forms of implementing this disclosure. For example, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that computer- or processor-readable instructions, performed by a computer and/or processor, would be preferred, but that an application specific integrated circuit (ASIC), gate array or similar hardware structure, could be substituted.

The invention claimed is:

1. An optical processing system, comprising:
    a photodetector array to obtain an image of light modulated by reflection off a data track defined on optical media, wherein the image comprises at least one framing mark and at least one data region; and
    a post-processor configured to:
        analyze the image and to recognize the at least one framing mark and data within the at least one data region;
        derive a scaling factor by measurement of at least one framing mark and comparing the measurement to dimensions of known framing marks; locate data within the image based on a direction from a location of a
        recognized framing mark and a distance based on the scaling factor, wherein a relative size and location of framing marks and data regions is predetermined;
        focus the image, if distortion of the recognized framing marks in the image is indicated by differences from an expected appearance of the framing marks, by repositioning lenses based on a function of the scaling factor; and
        read the located data from the image.

2. The system of claim 1, wherein the at least one framing mark comprise data not allowed for use within data regions.

3. The system of claim 1, wherein relative placement of data regions and the at least one framing mark is known.

4. The system of claim 1, wherein the at least one framing mark and the at least one data region define a pattern along the data track on the optical media.

5. The system of claim 1, wherein recognition by the post-processor comprises associating pixels within the image with data elements within the data region and interpreting the associated pixels.

6. The system of claim 1, wherein the post-processor comprises:
    a focus-improvement module to digitally focus the data region within the image by analyzing distortion in the framing marks within the image and by reversing that distortion on the data region within the image.

7. A post-processor for analysis of an image taken off optical storage media, comprising:
    a framing mark recognition module to recognize framing marks within the image;
    scaling module to determine a scaling factor associated with the image by analysis of the recognized framing marks within the image in view of a size of the recognized framing marks;
    a focus improvement module configured for focusing the image, if distortion of the recognized framing marks in the image is indicated by differences from an expected appearance of the framing marks, by repositioning lenses based on a function of the scaling factor; and
    a data analysis module configured for locating data within the image based on a direction from a location of a recognized framing mark and a distance based on the scaling factor, wherein a relative size and location of framing marks and data regions is predetermined.

8. A post-processor of claim 7, wherein the framing mark recognition module recognizes framing marks within the image by recognizing data not allowed for use within data regions and by comparing the recognized data with a known framing mark appearance.

9. The post-processor of claim 7, wherein the analysis performed by the scaling module determines a size of a portion of the optical media associated with each pixel.

10. The post-processor of claim 7, further comprising a data region analysis module to use the scale to read data elements within a data region by associating pixels within the image to the data elements within the data region and by evaluating the associated pixels to derive data.

11. A method of reading data from an optical media, comprising:
    obtaining an image of a portion of the optical media with a photo-detector array, wherein the image comprises pixels organized as an M by N array, wherein M and N are integers greater than 1;
    recognizing at least one framing mark within the image; and
    deriving a scaling factor by measurement of at least one of the framing mark and comparing the measurement to dimensions of known framing marks;
    locating data within the image based on a direction from a location of a recognized framing mark and a distance based on the scaling factor, wherein a relative size and location of framing marks and data regions is predetermined;
    focusing the image, if distortion of the recognized framing marks in the image is indicated by differences from an expected appearance of the framing marks, by repositioning lenses based on a function of the scaling factor; and
    reading the located data from the image.

12. The method of claim 11, wherein recognizing at least one framing mark within the image comprises:
recognizing data not legally contained within data regions within the image.

13. The method of claim 11, wherein recognizing at least one framing mark within the image comprises:
confirming that the recognized data is a framing mark based on a comparison of the recognized framing mark to an appearance of known framing marks.

14. The method of claim 11, additionally comprising:
digitally focusing the data region within the image by analyzing distortion of the framing marks within the image and by applying an algorithm that reverses that distortion on the data region within the image.

15. The method of claim 11, additionally comprising:
obtaining additional images of the optical media, wherein a location of each data region within each of the additional images is indicated by framing marks within each of the additional images.

16. An optical data storage system, comprising:
means for obtaining an image of a portion of an optical media with a photo-detector array, wherein the image comprises pixels organized as an M by N array, wherein M and N are integers greater than 1;
means for recognizing at least one framing mark within the image, wherein the recognizing comprises:
recognizing data not allowed within data regions and therefore part of a framing mark; and
comparing the recognized framing mark to known framing marks to confirm that the recognized framing mark is a framing mark;
means for deriving a scaling factor based on size of the framing mark within the image and a known size of the framing mark on the optical media; and
locating data within the image based on a direction from a location of a recognized framing mark and a distance based on the scaling factor, wherein a relative size and location of framing marks and data regions is predetermined;
focusing the image, if distortion of the recognized framing marks in the image is indicated by differences from an expected appearance of the framing marks, by repositioning lenses based on a function of the scaling factor; and
reading the located data from the image.

* * * * *

UNITED STATES PATENT AND TRADEMARK OFFICE
CERTIFICATE OF CORRECTION

| | | |
|---|---|---|
| PATENT NO. | : 7,468,815 B2 | Page 1 of 1 |
| APPLICATION NO. | : 10/955703 | |
| DATED | : December 23, 2008 | |
| INVENTOR(S) | : Darwin Mitchel Hanks | |

It is certified that error appears in the above-identified patent and that said Letters Patent is hereby corrected as shown below:

In column 6, line 18, in Claim 7, insert -- a -- before "scaling".

In column 6, line 20, in Claim 7, insert -- known -- before "size".

In column 6, line 32, in Claim 8, delete "A" and insert -- The --, therefor.

Signed and Sealed this

Twenty-first Day of April, 2009

JOHN DOLL
*Acting Director of the United States Patent and Trademark Office*